United States Patent Office 3,035,090
Patented May 15, 1962

---

3,035,090
PROCESS FOR PRODUCING ACRYLIC ACID ESTERS
Jesse T. Dunn, Charleston, W. Va., assignor to Union Carbide Corporation, a corporation of New York
No Drawing. Filed Mar. 23, 1959, Ser. No. 800,984
6 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl catalyst, or other catalysts such as the complex triphenylphosphine-nickel halide compounds or the complex nickel halide-quaternary ammonium compounds.

It has now been found that the complex combinations obtained by the admixture of a nickel halide with an organic mercapto carboxylic acid or mercaptoalkanol are excellent catalysts for the production of acrylic acid esters.

The organic mercapto carboxylic acids suitable for use in this invention are the mercaptobenzoic acids represented by the general formula:

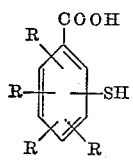

wherein the mercapto radical can be in the ortho, meta or para position relative to the carboxyl radical, and wherein the R radicals represent hydrogen or an alkyl radical containing from 1 to about 10 carbon atoms; and the mercaptoalkanoic acids as represented by the general formula:

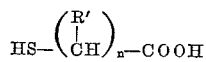

wherein $n$ is an integer having a value of from 1 to about 20, preferably from 1 to about 8, and R' represents a hydrogen atom, a lower alkyl radical or an amino radical. The suitable mercaptoalkanols are represented by the general formula:

wherein $n$ and R' have the same meanings as defined above.

Illustrative of the mercapto compounds which can be used are 2-mercaptobenzoic acid, 3-mercaptobenzoic acid, 4-mercaptobenzoic acid, 2-mercapto-4-methylbenzoic acid, 2-mercapto-4-butylbenzoic acid, 4-mercapto-6-isopropyl benzoic acid, 2-mercapto-4-decylbenzoic acid, mercaptoacetic acid, 2-methylmercaptoacetic acid, 3-mercaptopropionic acid, 4-mercaptobutanoic acid, 2-ethyl-6-mercaptohexanoic acid, 10-mercaptodecanoic acid, 2-amino-3-mercaptopropanoic acid, 2-amino-6-mercaptohexanoic acid, 2-mercaptoethanol, 2-methyl-2-mercaptoethanol, 2-ethyl-6-mercaptohexanol, 2-amino-3-mercaptopropanol, 8-mercaptooctanol, and the like.

The catalyst complexes suitable for use in this invention are prepared by admixing a nickel halide, such as nickel bromide, nickel chloride, nickel fluoride and nickel iodide, with one or more of the above-defined organic mercaptans. In preparing the catalyst complex the order of addition of the two components is not critical. Thus, the organic mercaptan can be added initially to the alcohol reactant to be used in producing the acrylic acid ester, followed by the nickel halide component, or the reverse order of addition can be followed. The acrylic acid esters are then produced by the interaction of acetylene with carbon monoxide and the alcohol at elevated temperature and under increased pressure in the presence of a catalytic amount of the catalyst complex. The use of the catalyst complexes of this invention result in a high ratio of monomer to polymer.

The starting alcohols are preferably the aliphatic monohydroxy saturated alcohols and ether alcohols having up to about 22 carbon atoms and preferably from 1 to about 12 carbon atoms in the molecule. Illustrative alcohols are ethanol, isopropanol, tertiary butanol, pentanol, 2-ethylhexanol, dodecanol, ethyleneglycol monomethyl ether, ethylene glycol monoethyl ether, ethylene glycol monobutyl ether, and the like.

The reaction is successfully carried out with the catalyst complexes of this invention at temperatures of from about 90° C. to about 250° C. or higher. Temperatures of from about 100° C. to about 200° C. are preferred. The reaction can be expedited by the use of slight pressures, and we prefer to operate at pressures exceeding about 100 p.s.i.g., with pressures of from about 400 p.s.i.g. to 500 p.s.i.g. most preferred. Higher pressures up to about 4000 p.s.i.g. to 5000 p.s.i.g. can be used with proper precautions.

The mole ratio of nickel halide to organic mercaptan compound can be varied over wide limits and does not appear to be critical; nevertheless, we prefer to employ about equimolar amounts of each component. The total amount of catalyst complex charged to the reaction mixture is not critical and can be varied over a wide range, so long as a catalytic amount is present. When based on the alcohol charged, it has been found that a catalyst complex containing about 0.0622 mole each of the nickel halide and the organic mercaptan compound per 16 moles of alcohol yields the highest conversions from an economical viewpoint. Higher concentrations of catalyst give a faster reaction but at greater cost; while lower concentrations, though more economical, result in lower productivity.

The reaction can be carried out in a batchwise manner or in a continuous manner by methods which are known to the art. The acetylene and carbon monoxide can be added separately, or for reasons of safety, as a mixture of gases, which mixture can be widely varied.

The following examples further serve to illustrate this invention. Parts are by weight unless otherwise specified.

*Example 1*

A three-liter stainless steel rocking autoclave was charged with 740 grams of ethanol, 13.6 grams of nickel bromide and 10.6 grams of 2-mercaptobenzoic acid, sealed and purged, first with carbon monoxide and then with a 1:1 mixture, by volume, of acetylene and carbon monoxide. The autoclave was rocked and the pressure was increased to about 40 p.s.i.g. by the further addition of acetylene-carbon monoxide mixture. The gas addition was stopped and the autoclave was heated to 100° C., at which time the pressure was increased 25 p.s.i.g. by the addition of acetylene. The total pressure was then increased to 300 p.s.i.g. with the acetylene-carbon monoxide mixture, and heating was continued to a temperature of about 150° C. At this point the pressure was increased to 450 p.s.i.g. and maintained between 400 p.s.i.g. to 450 p.s.i.g. by the periodic addition of the acetylene-carbon monoxide mixture for 4.5 hours. During this period the temperature was maintained between 150° C. to 162° C. The reaction was stopped by aircooling the autoclave and then releasing the pressure. The reaction mixture was filtered to remove solid materials and the filtrate was distilled to separate monomeric ethyl acrylate, most of which distilled as the ethyl acrylate-ethanol azeotrope, from the higher boiling acrylate esters and polymer-containing residue. The yield of monomeric ethyl acrylate was 424 grams.

In a similar manner ethyl acrylate is produced using 4-mercaptobenzoic acid to prepare the catalyst complex.

*Example 2*

In the manner described in Example 1, 2-ethylhexyl acrylate is produced by reacting 2,600 grams of 2-ethylhexanol with acetylene and carbon monoxide at about 175° C. in the presence of a catalyst complex prepared with 13.6 grams of nickel bromide and 10.6 grams of 2-mercaptobenzoic acid.

*Example 3*

In the manner described in Example 1, 740 grams of ethanol containing 5.6 grams of mercuric bromide and 9.6 grams of butyl bromide was treated with acetylene and carbon monoxide at 153° C. to 160° C. over a 4.5 hour period in the presence of a catalyst complex prepared from 6.8 grams of nickel bromide and 5.3 grams of 2-mercaptobenzoic acid. The yield of monomeric ethyl acrylate was 477 grams.

*Example 4*

In the manner described in Example 1, 740 grams of ethanol was treated with acetylene and carbon monoxide at 162° C. to 171° C. over a 5.4 hour period in the presence of a catalyst complex prepared from 13.6 grams of nickel bromide and 7.2 grams of mercaptobenzoic acid. The yield of monomeric ethyl acrylate was 447 grams.

*Example 5*

In the manner described in Example 1, 740 grams of ethanol containing 5.6 grams of mercuric bromide and 9.6 grams of butyl bromide was treated with acetylene and carbon monoxide at 152° C. to 160° C. over a 4.8 hour hour period in the presence of a catalyst complex prepared from 6.8 grams of nickel bromide and 3.6 grams of mercaptoacetic acid. Yield of monomeric ethyl acrylate was 487 grams.

*Example 6*

In the manner described in Example 1, 740 grams of ethanol was treated with acetylene and carbon monoxide at 158° C. to 180° C. over a 3.8 hour period in the presence of a catalyst complex prepared from 13.6 grams of nickel bromide and about 7.5 grams of 2-amino-3-mercaptopropionic acid. The yield of ethyl acrylate was about 80 grams.

In a similar manner ethyl acrylate is produced using 2-amino-6-mercaptohexanoic acid to produce the catalyst complex.

*Example 7*

In the manner described in Example 1, 740 grams of ethanol was treated with acetylene and carbon monoxide at 160° C. to 180° C. over a 4.5 hour period in the presence of a catalyst complex prepared from 13.6 grams of nickel bromide and 4.9 grams of 2-mercaptoethanol. The yield of monomeric ethyl acrylate was 112 grams.

What is claimed is:

1. In the manufacture of acrylic acid ester by the reaction of acetylene with carbon monoxide and an alcohol at elevated temperature and under increased pressure, the improvement which comprises carrying out said reaction in the presence of a catalyst complex of a nickel halide and an organic mercaptan selected from the group consisting of mercaptobenzoic acids represented by the general formula:

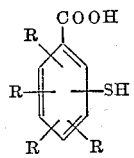

wherein R represents a member selected from the group consisting of hydrogen and alkyl radicals containing from 1 to about 10 carbon atoms; mercaptoalkanoic acids represented by the general formula:

and mercaptoalkanols as represented by the general formula:

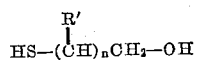

wherein R' represents a member selected from the group consisting of hydrogen, a lower alkyl radical and an amino radical and $n$ is an integer having a value of from 1 to about 20.

2. A method as claimed in claim 1, wherein the organic mercaptan employed is 2-mercaptobenzoic acid.

3. A method as claimed in claim 1, wherein the organic mercaptan employed is mercaptoacetic acid.

4. A method as claimed in claim 1, wherein the organic mercaptan employed is 2-amino-3-mercaptopropanoic acid.

5. A method as claimed in claim 1, wherein the organic mercaptan employed is 2-amino-6-mercaptohexanoic acid.

6. A method as claimed in claim 1, wherein the organic mercaptan employed is 2-mercaptoethanol.

References Cited in the file of this patent

UNITED STATES PATENTS

| | | |
|---|---|---|
| 2,493,986 | McNab et al. | Jan. 10, 1950 |
| 2,680,758 | Thomas | June 8, 1954 |
| 2,738,364 | Reppe et al. | Mar. 13, 1956 |
| 2,822,372 | Meister | Feb. 4, 1958 |
| 2,845,451 | Lautenschlager et al. | July 29, 1958 |
| 2,886,591 | Lautenschlager et al. | May 12, 1959 |